US006359047B1

United States Patent
Thieu et al.

(10) Patent No.: US 6,359,047 B1
(45) Date of Patent: Mar. 19, 2002

(54) GAS HYDRATE INHIBITOR

(75) Inventors: Vu Thieu, Lodi; Kirill N. Bakeev, Ringwood; Jenn S. Shih, Paramus, all of NJ (US)

(73) Assignee: ISP Investments Inc., Wilmington, DE (US)

( * ) Notice: Subject to any disclaimer, the term of this patent is extended or adjusted under 35 U.S.C. 154(b) by 0 days.

(21) Appl. No.: 09/812,504

(22) Filed: Mar. 20, 2001

(51) Int. Cl.[7] .................................................. C07C 7/20
(52) U.S. Cl. .............................. 524/376; 137/3; 137/13; 507/90; 585/15; 585/950
(58) Field of Search .............................. 524/376; 137/3, 137/13; 585/15, 950; 507/90

(56) References Cited

U.S. PATENT DOCUMENTS

| 4,302,220 A | * | 11/1981 | Volkamer et al. | ............... 55/32 |
| 5,432,292 A | * | 7/1995 | Sloan, Jr. | ..................... 585/15 |
| 5,604,275 A | * | 2/1997 | Zhong et al. | ................ 524/379 |
| 5,637,296 A | * | 6/1997 | Rocafort | .................. 424/70.11 |
| 5,639,925 A | * | 6/1997 | Sloan, Jr. et al. | ............. 585/15 |
| 5,723,524 A | * | 3/1998 | Cohen et al. | ................ 524/376 |
| 5,741,758 A | * | 4/1998 | Pakulski | ....................... 507/90 |
| 5,874,660 A | * | 2/1999 | Colle et al. | .................... 585/15 |
| 6,025,302 A | * | 2/2000 | Pakulski | ....................... 507/90 |
| 6,093,863 A | * | 7/2000 | Cohen et al. | ................. 585/15 |
| 6,096,815 A | * | 8/2000 | Cohen et al. | ................ 524/379 |
| 6,117,929 A | * | 9/2000 | Bakeev et al. | .............. 524/376 |
| 6,180,699 B1 | * | 1/2001 | Bakeev et al. | .............. 524/376 |
| 6,242,518 B1 | * | 6/2001 | Bakeev et al. | .............. 524/376 |

FOREIGN PATENT DOCUMENTS

WO    WO 95/32356    * 11/1995

* cited by examiner

Primary Examiner—Margaret Medley
(74) Attorney, Agent, or Firm—Walter Katz; William J. Davis; Marilyn J. Maue

(57) ABSTRACT

A gas hydrate inhibitor includes, by weight, a copolymer including about 80 to about 95% of polyvinyl caprolactam (VCL) and about 5 to about 20% of N,N-dialkylaminoethyl (meth)acrylate or N-(3-dimethylaminopropyl) methacrylamide.

7 Claims, 1 Drawing Sheet

Synthetic Gas; P=75 bars; T=4.5 °C

VCL = N-vinylcaprolactam
DEAEMA = N,N-diethylaminoethyl methacrylate
24 hours = 1,440 minutes
See further details in text

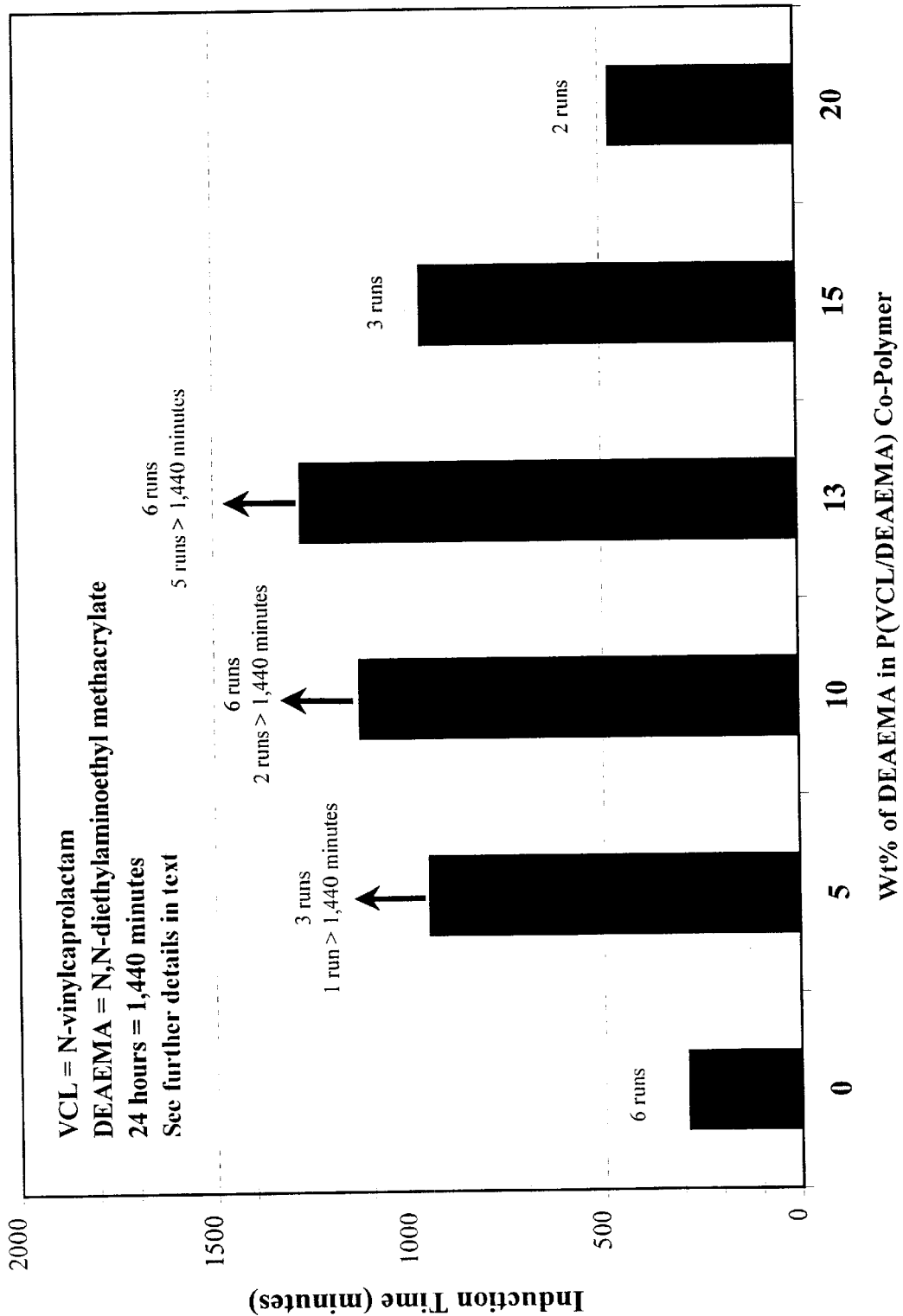

GAS HYDRATE INHIBITOR

BACKGROUND OF THE INVENTION

1. Field of the Invention

The invention relates to a method for preventing or retarding the formation of gas hydrates or for reducing the tendency of such hydrates to agglomerate during the transport of a fluid comprising water and a hydrocarbon through a conduit, and, more particularly, to the addition to the fluid of a gas hydrate inhibitor which is a copolymer of vinyl caprolactam and N,N-diethylaminoethyl(meth)acrylate of defined composition, which is preferably made and applied in a suitable solvent.

2. Description of the Prior Art

It is well known in the art that the formation of gas hydrates in a conduit, e.g. a pipeline, during the transport of liquids, such as oil, and gases, particularly lower hydrocarbons, e.g. methane, ethane, propane, butane, isobutane and natural gas is a serious problem, especially in areas with a low temperature in the winter season or in the sea. Generally the temperatures are so low that gas hydrate formation, due to the inevitable presence of co-produced water in the wells takes place, if no special steps are taken. Insulation decreases the chance of gas hydrate formation; however, if the field is relatively small and far away from the production platform, the costs of using insulation are too high to make such field economically attractive. It is also known to add anti-freeze compounds, for example, glycol or methanol, during transport to minimize gas hydrate formation; however, large quantities of these compounds are required to be effective which is expensive. Alkyl glycosides also have been used for this purpose.

A representation of the prior art in this field are the following U.S. Pat. Nos. 4,915,176; 5,420,370; 5,432,292; 5,723,524; 5,741,758 and 6,117,929; EPA 0526929A1; EPO 0323774A1; Can. Pat. Appln 2,073,577; WO 93/25798; WO 95/17579; Gas Hydrates and Hydrate Prevention 73 GPA Annual Convention, pgs 85–93; WO 96/08456; WO 96/08636; WO 93/25798; EPA 0457375A1 and WO 9412761.

SUMMARY OF THE INVENTION

What is described herein is a useful composition for effectively preventing or retarding the formation of gas hydrates, or for reducing the tendency of gas hydrates to agglomerate, during the transport of a fluid comprising water and a hydrocarbon, through a conduit, which includes a copolymer of vinyl caprolactam (VCL) and N,N-diethylaminoethyl(meth) acrylate (DEAEMA), preferably 80–95 wt. % of VCL and 5–20 wt. % DEAEMA. Most preferably, the copolymer is made and applied in a low molecular weight glycol ether, usually 2-butoxyethanol (BGE).

DETAILED DESCRIPTION OF THE INVENTION

Generally, the gas hydrate inhibitor of the invention, i.e. copolymer of 80–95 wt. % VCL and 5–20 wt. % DEAEMA, is present in an amount of about 30 to 50% by weight of the composition, i.e. in admixture with the solvent. The product inhibition concentration in the pipeline, i.e. in the aqueous phase, is about 0.1 to 3% by weight. The solvent inhibition concentration, accordingly, is about 0.1 to 5% by weight in the aqueous phase.

Suitable solvents include low molecular glycol ethers containing an alkoxy group having at least 3 carbon atoms, N-methylpyrrolidone (NMP), ethylene glycol, water and blends thereof. Representative glycol ethers include 2-butoxyethanol (ethylene glycol monobutyl ether); propylene glycol butyl ether; (diethylene glycol) monobutyl ether; and 2-isopropoxy-ethanol. 2-Butoxyethanol (BGE) is preferred.

Preferably the copolymers are made in the desired solvent and maintained therein in the composition of the invention. Less preferably, they are made in another solvent, such as isopropanol solvent, the solvent removed, and the desired glycol ether solvent added.

Most preferably, the copolymer is made in BGE at about 50% solids and then ethylene glycol is added with water as solvent.

EVALUATION OF GAS HYDRATE INHIBITOR COMPOSITIONS

A. General Test Method

The gas hydrate inhibition tests were conducted in a 500 ml, 316 stainless steel autoclave vessel having a usable volume of 200 ml, equipped with a thermostated cooling jacket, sapphire window, inlet and outlet, platinum resistance thermometer (PRT) and magnetic stirring pellet. The rig is rated up to 400° C. and down to −25° C. Temperature and pressure are data logged, while the cell content is visually monitored by a boroscope video camera connected to a time lapsed video recorder. Hydrate formation in the rig is detected using a combination of three methods: visual detection of hydrate crystals, decrease in vessel pressure due to gas uptake and by the temperature exotherm created by heat released during hydrate formation.

The rigs were thoroughly cleaned after each test. Each rig was initially rinsed 3 times each with 500 ml tap water after the test fluid was removed. An air drill fitted with a 3M Scotch-Brite cylindrical scouring pad was then used to remove traces of any adsorbed chemicals therein with a small amount of water added to the rig. Each rig was then rinsed with 500 ml double distilled water 2 more times and dried. A blank solution of 200 ml double distilled water was run to confirm test reproducibility. The formation of hydrates within 4–15 minutes was taken as a standard time for a given set of testing conditions, i.e. synthetic gas, 35 bar, and 4.5° C. The cleaning procedure was repeated until a reproducible time was achieved.

Synthetic gas mixture of the following composition was used for hydrate testing:

| Component | Mol % |
|---|---|
| n-Pentane | 0.19 |
| iso-Pentane | 0.20 |
| iso-Butane | 0.62 |
| n-Butane | 1.12 |
| Propane | 4.63 |
| Carbon Dioxide | 1.36 |
| Ethane | 10.84 |
| Nitrogen | 1.75 |
| Methane | 79.29 |
| Total | 100.00 |

B. Evaluation Procedure 200 ml of pre-cooled polymer solution (with total concentration equal to 0.5 wt %) was placed into the vessel, followed by a PTFE stirrer pellet. The rig top was replaced and the securing ring tightened. The boroscope and video camera were then attached to the apparatus. The rig was then stirred and allowed to cool to the required temperature. Upon reaching the pre-set temperature, the stirrer was stopped and the video recorder and computer data logger started. The rig was then charged with synthetic gas to reach the required pressure. A slightly higher pressure (2–3 bars) was used to allow for some gas dissolution in the water and the slight drop in the pressure as the gas cools. The stirrer was started at 500 rpm and the temperature (4.5° C.), pressure (75 bar) and start time ($t_0$) recorded. The run was terminated upon the formation of hydrates, usually at the moment of a pressure drop, which might or might not follow the exotherm and visual hydrates formation depending on the amount of the hydrates formed and the amplitude of the effect. The final temperature, pressure and time (t) of the hydrates formation were noted.

The onset of the hydrate formation time=$t-t_0$ (mins) is indicated in the examples given below. The relative efficiencies of the inhibiting polymers are thus proportional to the measured induction times.

Based on data obtained using PVTsim, a commercial hydrate equilibrium prediction package, the equilibrium melting temperature for hydrate decomposition for the synthetic gas in double distilled water and P=75 bar is about 19.0° C., the hydrate sub-cooling is equal to 14.5° C. (T=4.5° C. is the temperature of the measurements).

EXAMPLES 1–6

Preparation of Poly(VCL/DEAEMA) in 2-Butoxyethanol

Into a 1-l, 4-neck resin kettle, fitted with a stainless steel anchor agitator, a nitrogen purge dip tube, an adapter and a reflux condenser, added 150 g of 2-butoxyethanol. Prepared the feeding solution by mixing defined amounts of N-vinylcaprolactam (VCL), and N,N-diethylaminoethyl (meth)-acrylate (DEAEMA) and di-t-butyl peroxide as initiator. The reactor was purged with nitrogen throughout the experiment and heated to 150° C. After the temperature reached 150° C., purged with nitrogen for ½ hour. Pumped the feeding solution into the kettle over 2 hours. The reaction was held at 150° C. for 1.5 hours. Then 8 boosters of di-t-butyl peroxide were added every 1.5 hours. Waited for 1.5 hours after the last booster was charged, and cooled the mixture to room temperature.

Referring now to the FIGURE, the plot shows the performance, in terms of average induction times for the onset of gas hydrate formation, of P(VCL/DEAEMA) at various compositions. The test period for these trials was 24 hours (1,440 minutes). Upon the formation of hydrates, the run was terminated and the time of hydrate formation noted.

In cases where hydrates had not formed during the 24 hour time period, those runs were also terminated and the induction times recorded as 1,440 minutes. In such instances, those samples were, therefore, effective to times greater than 1,440 minutes. Arrows in the figure illustrate this effect, in particular, for the 13 wt % DEAEMA case, where 5 out of 6 runs were hydrate-free over the 24 hour test period.

The FIGURE shows the effectiveness of gas hydrate inhibition of a copolymer of VCL and DEAEMA at a wt. % range of 80–95 wt. % VCL and 5–20 wt. % DEAEMA, preferably 85–95% VCL and 5–15% DEAEMA, as measured by the induction time, as compared to 100% VCL and 0% DEAEMA. Within the preferred range, the induction time in minutes is at least 1000 to 1250, whereas lower or higher amounts of DEAEMA in the copolymer lower the induction time to only about 250 to 500 minutes. An optimum performance is achieved at about 13 wt. % DEAEMA.

Unneutralized copolymer is preferred for successful performance; however, if desired to increase the water solubility of the copolymer in the system, it may be neutralized to a suitable pH.

While VCL is the preferred monomer, similar results may be obtained with vinyl pyrrolidone, N-isopropyl(meth) acrylamide, (meth)acryloylpyrrolidine, wholly or in part, in its place; and with other comonomers such as N,N-dimethylaminoethyl methacrylate, N-(3-dimethylaminopropyl) methacrylamide (DMAPMA) wholly or in part, for DEAEMA.

In practice, the compositions of the invention exhibit both gas hydrate and some corrosion inhibition properties, which, thereby, contributes to their commercial success.

While the invention has been described with particular reference to certain embodiments thereof, it will be understood that changes and modifications may be made which are within the skill of the art.

What is claimed is:

1. A gas hydrate inhibitor composition for preventing or retarding the formation of gas hydrates or for reducing the tendency of gas hydrates to agglomerate consisting essentially of, by weight, in an amount of about 30 to 50% of the total composition, a copolymer of about 80 to about 95% of polyvinyl caprolactam and about 5 to about 20% of a comonomer which Is an N,N-dialkylaminoethyl(meth) acrylate or N-(3-dimethylaminopropyl) methacrylamide, which copolymer is made and used in a low molecular weight glycol ether containing an alkoxy group having at least 3 carbon atoms.

2. A gas hydrate inhibitor composition according to claim 1 wherein said comonomer is N,N-diethylaminoethyl(meth) acrylate or N,N-dimethylaminoethyl(meth) acrylate present in an amount of 5–15%.

3. A gas hydrate inhibitor composition according to claim 1 wherein said comonomer is N-(3dimethylaminopropyl) methacrylamide.

4. A gas hydrate inhibitor composition according to claim 1 of about 87 wt % polyvinyl caprolactam and about 13 wt. % N,N-dialkylaminoethyl(meth)acrylate.

5. A gas hydrate inhibitor composition according to claim 1 which inhibitor is made in and includes 2-butoxyethanol as solvent.

6. A gas hydrate inhibitor composition of claim 5 which further includes ethylene glycol as cosolvent.

7. A gas hydrate inhibitor composition of claim 5 which copolymer is unneutralized or neutralized to a suitable pH.

* * * * *